US006177652B1

(12) United States Patent
Ivansons

(10) Patent No.: US 6,177,652 B1
(45) Date of Patent: Jan. 23, 2001

(54) STERILE CONTAINMENT WELDING DEVICE WITH SELF-MONITORING HEATER UNIT FOR PLASTIC TUBES

(75) Inventor: Ivars V. Ivansons, Claymont, DE (US)

(73) Assignee: Denco, Inc., Wilmington, DE (US)

( * ) Notice: Under 35 U.S.C. 154(b), the term of this patent shall be extended for 0 days.

(21) Appl. No.: 09/476,213

(22) Filed: Dec. 30, 1999

Related U.S. Application Data

(63) Continuation of application No. 09/036,775, filed on Mar. 9, 1998, now Pat. No. 6,020,574.

(51) Int. Cl.[7] .............................. H05B 1/00; B32B 31/00
(52) U.S. Cl. ........................................... 219/211; 156/155
(58) Field of Search ..................................... 219/388, 243, 219/221, 240, 241; 156/155, 156, 157, 158, 159, 304.2, 583.1, 583.2; 374/179

(56) References Cited

U.S. PATENT DOCUMENTS

| | | |
|---|---|---|
| 3,778,581 | 12/1973 | Denny . |
| 4,345,141 * | 8/1982 | Little ..................................... 219/207 |
| 4,537,516 * | 8/1985 | Epstein ...................................... 374/1 |
| 4,708,495 | 11/1987 | Kitzinger et al. . |
| 5,158,630 * | 10/1992 | Shaposka et al. .................... 156/158 |
| 5,209,800 * | 5/1993 | Spencer et al. ....................... 156/158 |
| 5,244,522 * | 9/1993 | Spencer et al. ....................... 156/158 |
| 5,256,229 * | 10/1993 | Spencer ................................ 156/158 |
| 5,279,685 * | 1/1994 | Ivansons .............................. 156/158 |
| 5,397,425 * | 3/1995 | Ivansons et al. ..................... 156/503 |
| 5,399,213 * | 3/1995 | Oxley ..................................... 156/86 |
| 5,484,506 * | 1/1996 | DuPont et al. ....................... 156/503 |
| 5,525,186 | 6/1996 | Ivansons et al. . |

* cited by examiner

*Primary Examiner*—Teresa Walberg
*Assistant Examiner*—Daniel Robinson
(74) *Attorney, Agent, or Firm*—Connolly Bove Lodge & Hutz LLP

(57) ABSTRACT

A sterile containment welding device includes a self-monitoring heater unit upstream from the space between the tube receiving channels. The wafer is positioned in the unit and mounted for movement through the unit prior to moving through the space. The self-monitoring heater unit includes a heater which heats the wafer and a temperature sensor for monitoring the temperature created by the self-monitoring heater in a rapidly alternating sequence so that the wafer is heated to a predetermined temperature before being moved into the space and contacting the plastic tube or tubes.

20 Claims, 3 Drawing Sheets

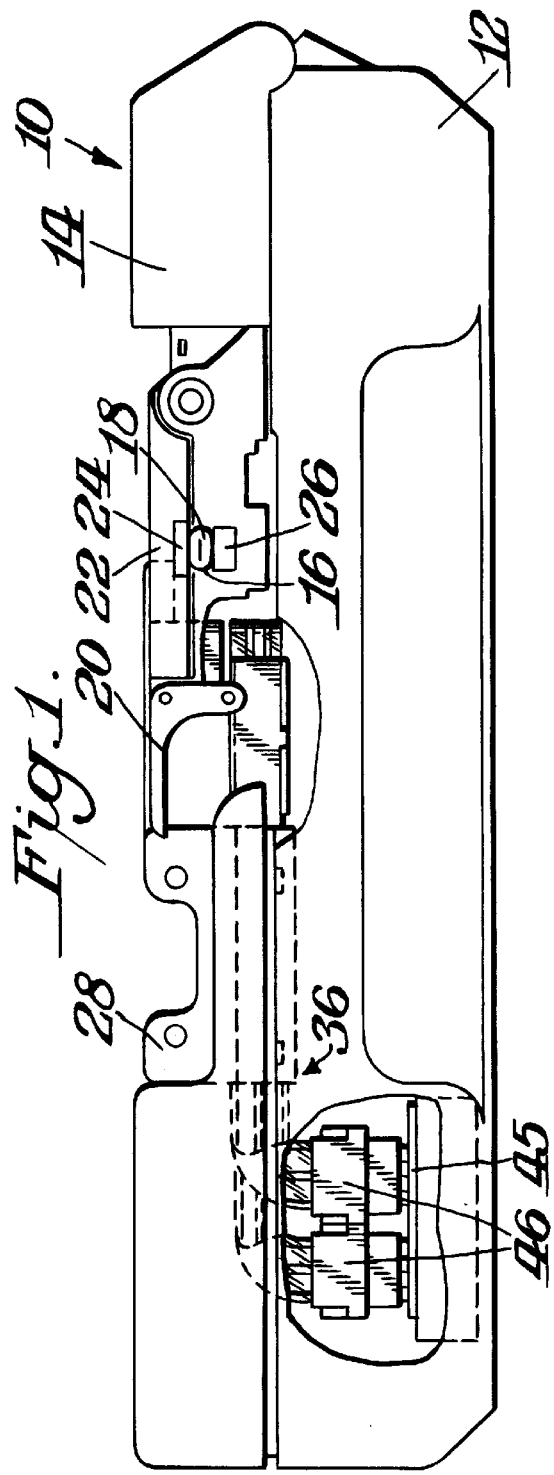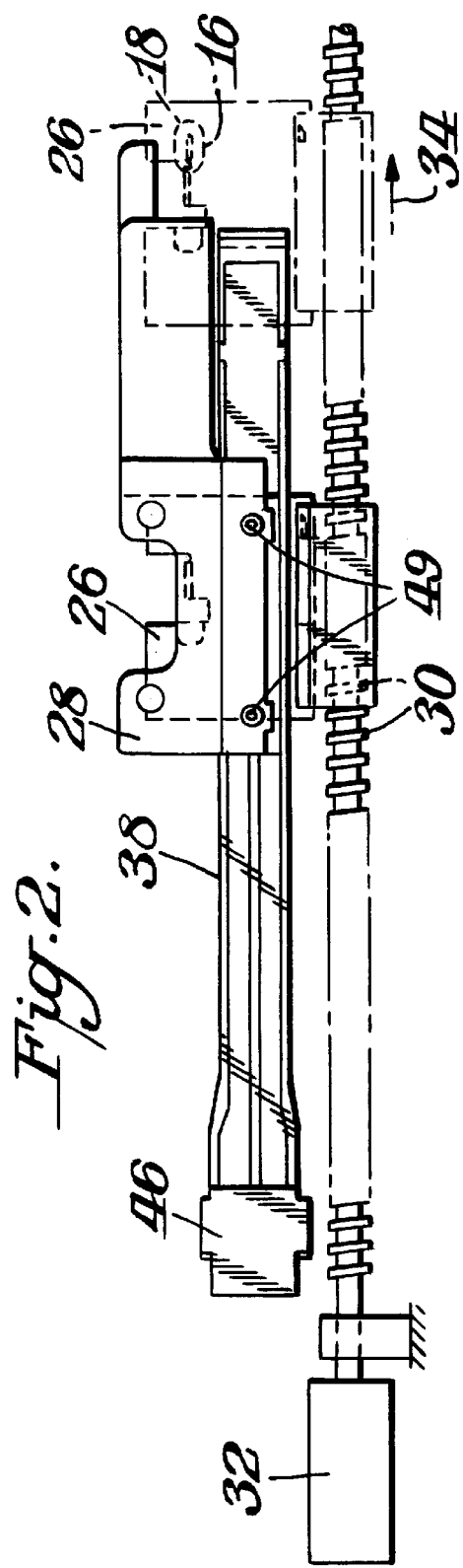

STERILE CONTAINMENT WELDING DEVICE WITH SELF-MONITORING HEATER UNIT FOR PLASTIC TUBES

CROSS-REFERENCE TO RELATED APPLICATION

This application is a continuation in part of application Ser. No. 09/036,775, filed Mar. 9, 1998, now U.S. Pat, No. 6,020,574.

BACKGROUND OF THE INVENTION

Sterile containment welding devices are known for connecting and disconnecting plastic tubes. Examples of such devices are found in U.S. Pat. Nos. 5,256,229, 5,279,685 and 5,397,425. In general, such devices include a pair of tube holders which would be in alignment with each other. Each of the tube holders has a base with the tube receiving channel into which a plastic tube would be placed. Each tube holder also includes a clamping jaw having a ram and anvil located above the channel. Thus, for example, when a tube is placed in the channel the clamping jaw is moved into locking engagement with the base and the anvil presses against the tube. In one practice of such devices each tube is placed in its channel in a bent condition by being bent upon itself with the bend of the tube extending outwardly from the outer edge of the channel. Thus, in a connect procedure the pair of bent ends would be disposed toward each other with each bent section in alignment with a corresponding bent section of the opposite tube holder. The connect procedure is achieved by passing a heated wafer between the two bent tube ends which causes the tube ends to melt so that a tube section from each tube can be pressed into contact with a corresponding tube section from the other tube and thereby join the two sets of tube sections together.

It is known to include in such devices a thermocouple which monitors the temperature of the heater device so that there is assurance that the wafer will be heated to the desired predetermined temperature. In operation when the device is actuated the heater operates continuously to raise its temperature until the desired temperature is reached. The thermocouple, which is separate from the heater, monitors the temperature rise to sense reaching the desired temperature.

SUMMARY OF THE INVENTION

An object of this invention is to provide such a sterile containment welding device with a self-monitoring heater which functions not only to heat the wafer but also to monitor the heating process.

A further object of this invention is to provide such a self-monitoring heater unit which functions in a rapid sequence of alternatingly monitoring the heater and performing its heating function.

A still further object of this invention is to use such self-monitoring heater for devices other than sterile containment welding devices.

In accordance with the preferred practice of this invention a sterile containment welding device includes a pair of alignable tube holders each of which has a tube receiving channel with the channels being spaced from each other. A wafer is provided for selective movement into the space to connect/disconnect the tube or tubes mounted in the channels and extending into the space. In accordance with this invention a self-monitoring heater unit is provided upstream from the space. The wafer is mounted for movement through the heater unit prior to movement through the space. The unit comprises a heater for heating the wafer when the wafer is disposed in the unit and further includes a temperature sensor for monitoring the temperature created by the unit. As a result, the wafer is raised to its predetermined temperature before being moved into the space.

In a preferred practice of the invention the heating and monitoring functions place in rapid sequence such as being a millisecond for each function. More preferably the heating period is substantially longer than the monitoring period. Preferably, the self-monitoring heater unit is a ribbon etched with a trace to act as a heater and which includes a thermocouple junction for the sensor.

THE DRAWINGS

FIG. 1 is a side elevational view partly broken away showing a sterile containment welding device in accordance with this invention;

FIG. 2 is a side elevational view of the self-monitoring heater assembly incorporated in the device of FIG. 1;

DETAILED DESCRIPTION

Figure 3:
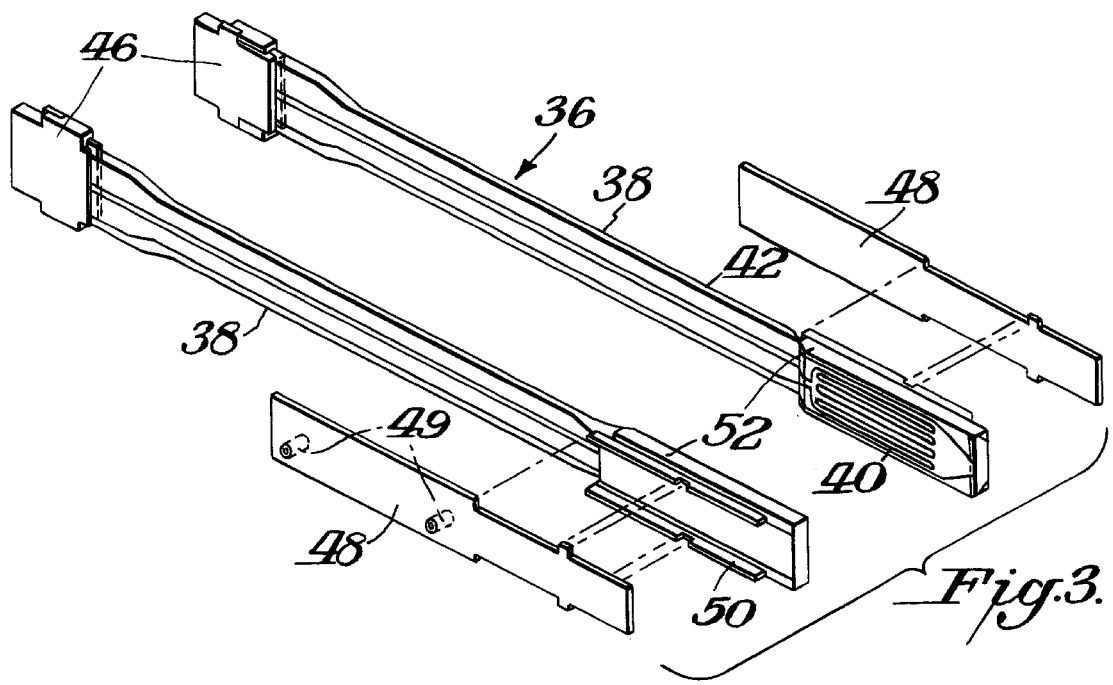
FIG. 3 is a exploded perspective view of the self-monitoring heater assembly shown in FIG. 2.

The present invention is directed to sterile containment welding devices for connecting or disconnecting plastic tubes. Such devices are known in the art. Examples are described in U.S. Pat. Nos. 5,256,229, 5,279,685, and 5,397,525, all of the details of which are incorporated herein by reference thereto. In particular, the later described self-monitoring heater unit is incorporated in the type of device shown in detail in U.S. Pat. No. 5,279,685.

In general, the sterile containment welding device 10 includes a base member 12 and a pivotally mounted upper member 14. The base member and upper member maybe considered as comprising a pair of tube holders each of which has a tube receiving channel 16 into which a tube or tube section 18 would be located in a known manner. The tube 18 is in a flattened condition by manipulating the handle 20 which actuates a clamping jaw 22 having an anvil 24 which is locatable over the channel 16 for pressing against the tube. The outer end of the channels are spaced from each other so that a wafer 26 shown in phantom in the right hand portion of FIG. 2 may pass through the space and heat two tube sections for welding or connect purposes or melt through a tube extending across the channels for disconnect purposes. Wafer 26 which is shown in full lines in the center of FIG. 2 is mounted in a holder 28 received a carriage connected to a drive 30 and moved by reversible motor 32 known manner in a forward direction as indicated by the arrow 34. The carriage is then returned to the start position. The wafer is heated prior to moving to the spacing to effect the connect/disconnect operation.

In accordance with this invention a self-monitoring heater unit 36 is provided to form the dual functions of heating the wafer and monitoring the heating temperature to assure that the wafer is heated to its desired predetermined temperature.

Figure 5:
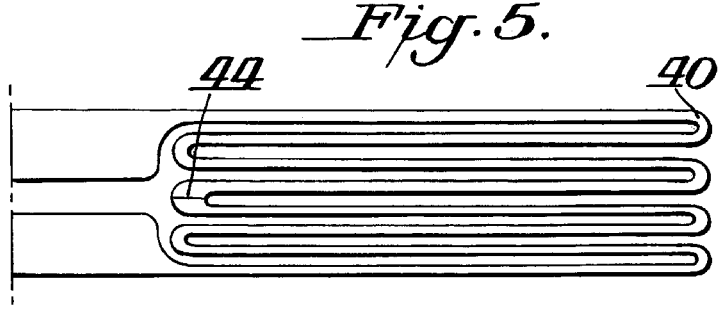
FIG. 5 is an enlarged side elevational view showing the etching trace for the self-monitoring heater unit of FIGS. 2–4.

As illustrated, the self-monitoring heater unit 36 comprises a pair of spaced, parallel thermocouple ribbons 38 which are formed by having an etched trace 40 as best shown in FIGS. 3 and 5. Each thermocouple ribbon is laminated onto a thick support member 42 such as a silicone tape. In the preferred practice of this invention a flat E-type thermocouple ribbon composed of Cu/Ni and Ni/Cr (Chromel-Constantan) with the individual legs of the thermocouple sized so that the electrical resistances equilibrate out to about 5.68±10% ohm resistance. The thermocouple trace experiences a temperature rise causing a voltage change that can be measured. In accordance with this invention utilization is made of the etched trace 40 so that it also functions as a heater. The trace 40 includes a thermocouple junction 44 to permit the monitoring to take place. In this manner there is first a heating operation and then a measuring or monitoring operation. The switching takes place by appropriate electronics at speeds of milliseconds. For example, there is one millisecond of the unit 36 functioning as a heater with the next millisecond functioning as a thermocouple when the unit 36 functions as a heater. The temperature rises then for the next millisecond. There is then a monitoring of the temperature with the temperature again rising in the subsequent millisecond until the desired temperature is reached. When the desired temperature is reached, the wafer 26 is heated to that temperature by being contacted on each side by an etched trace 40. The heated wafer then moves from unit 36 to the spacing between the tube holding channels.

Figure 4:
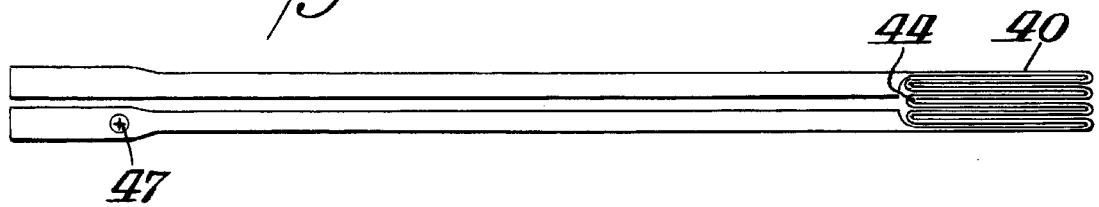
FIG. 4 is a top plan view of the self-monitoring heater unit shown in FIGS. 2–3.

In the preferred practice of the invention the thermocouple ribbon is about 0.002 inches thick. The polarity of the thermocouple is marked by etching a hole on the constantan or negative side of the thermocouple. FIG. 4 also illustrates the positive conductor wire 47 for the electrical conductor cables 46. The cables 46 are mounted to printed circuit board 45 as best shown in FIG. 1. The type-E thermocouple ribbon is preferably laminated onto a 0.001 inch thick silicone tape. The trace art work is registered with respect to the thermocouple junction 44. The trace is then etched followed by a covered lamination of 0.001 inch thick silicone tape.

As shown in FIG. 3 each ribbon 38 is connected to a cable 46 at one end thereof. A leaf spring 48 is provided for each ribbon 38 to urge the two ribbons toward each other. Each leaf spring 48 is mounted in a spring clamp 50 on an insulator support 52. A pair of screws 49 extend through the holder 28 and press against each spring 48 to control the spacing between the two parallel sections of unit 36 particularly the traces 40. Screws 49 thereby assure that the spacing is sufficient to allow wafer 26 to pass between the two traces 40 and yet be close enough to assure that there rubbing contact by each side of the wafer 26 and its respective heater trace 40.

Wafer 26 may be of any suitable construction and preferably is of the construction shown and described in U.S. Pat. Nos. 5,525,186 and 5,397,425, the details of which are incorporated herein by reference thereto.

Figure 6:
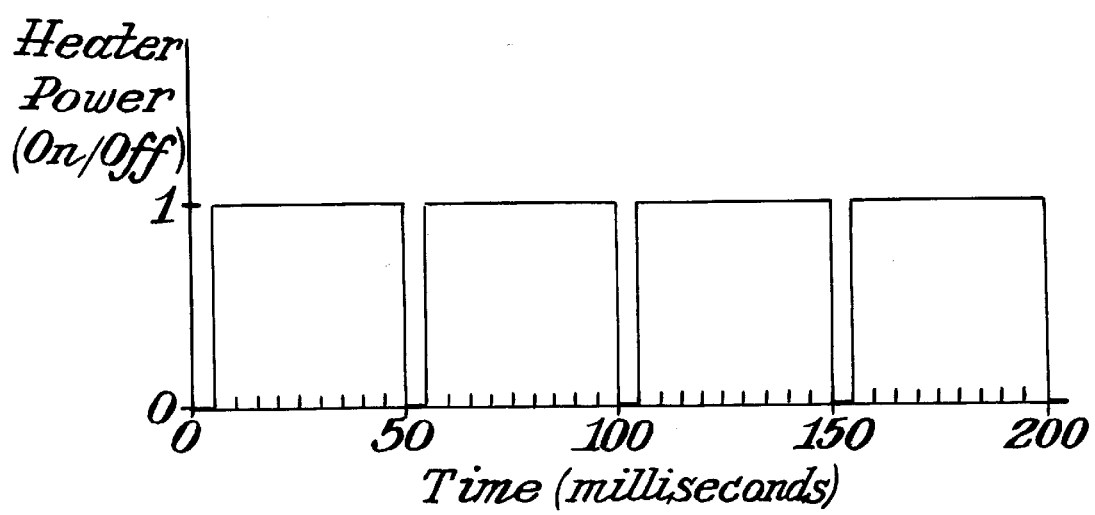
FIG. 6 is a graph showing the sequence of operation of the self-monitoring unit of this invention.

In the practice of the invention the wafer 26 would be mounted in the holder 28 between the closely spaced trace portions 40,40 of the self-monitoring heater unit 36. While the wafer is in this upstream position the unit 36 begins its rapid sequence of heating and temperature monitoring in the sequential steps illustrated in FIG. 6 until, for example, a predetermined temperature such as 300° C. is reached. FIG. 6 illustrates the sequence of heating and temperature monitoring to take place wherein the heating period of time (which might be considered a first fixed period of time) is nine times longer than the monitoring period of time (which might be considered a second fixed period of time). Thus, this rapid sequence permits the wafer or heat applying tool to reach a predetermined temperature in an accurate manner. With this practice of the invention the alternating sequence is a long fixed period of heating and a short period of monitoring. Because the wafer 26 in holder 28 is in the unit 36 with each side of the wafer 26 contacted by the heater element or trace 40 of unit 36, the wafer is raised to its predetermined temperature. The wafer is removed by the carriage from holder 28 and then moved downstream in the direction of arrow 34 away from unit 36 and into the space between the tube receiving channels 16 in a known manner.

The present invention thus provides a combined heater and thermocouple which results in a self-monitoring heater which detects the temperature rise of its own heating elements in a rapid sequential manner to effectively heat a wafer for thereby improving the heater performance of the sterile containment welding device.

The present invention is unique in that it utilizes the same structure which heats a device, such as a heat applying tool or in the preferred practice a wafer, and which alternately monitors the temperature of the tool so that there can be a reliable accurate reaching of that predetermined temperature. The same structure undergoes a sequence where, for one period of time, the structure has its heating function (without temperature monitoring) and then the same structure which had functioned as a heater no longer has that function, but instead functions as a temperature monitor. This sequence of heating and temperature monitoring takes place in a rapid manner during millisecond time periods.

The invention may be practiced by utilizing the same structure in an alternate manner for both heating and temperature monitoring. For example, the invention utilizes a thermocouple ribbon in such a manner that a continuous thermocouple junction runs down the center of the ribbon. A section of the ribbon is laminated onto a substrate and etched into a heater trace pattern leaving a thermocouple junction in the middle of the heating traces. This effectively creates a flexible heater that can sense its own temperature.

Although the invention has been described with particular reference to the heating of plastic tubes, the invention may have other applications where a heating sequence is periodically monitored for temperature determination. The following are some examples where the invention could be practiced. The heating/monitoring sequence could be used for the heating of automobile seats. In such practice the user would press the seat/heat button to initiate the heating/monitoring sequence until the desired temperature is reached. Another practice of the invention could be in the de-icing of aircraft wings. A further practice could be for instruments of small aircrafts. In such small aircrafts there is a need to maintain the instruments in a sufficiently warm condition. The invention could be used for assuring that the proper temperature is reached. A still further practice could be to keep seals warm, such as in spacecraft launching.

In the preferred practice of the invention the heat applying tool is moved to the heating site after the predetermined temperature has been reached. The invention may also be practiced where the heat applying tool is located at the heating site during the heating/monitoring sequence. The raising of the temperature of the heat applying tool would be discontinued once the predetermined temperature is reached. This could be done by either stopping the heating function or by simply supplying enough heat to maintain a generally constant temperature.

As should thus be apparent, the invention has wide application where the self-monitoring heater is used to assure reaching a predetermined temperature.

What is claimed is:

1. In a device for performing a heating operation including a heat applying tool for heating an object at a heating location, and a heater for heating said heat applying tool, the improvement being in that said heater includes a self-monitoring heater unit in selective contact with said tool, said self-monitoring heater unit including structure for alternately in a rapid sequence heating said tool and then monitoring the temperature of said tool until a predetermined temperature has been reached, and conveying structure for moving said tool to said heating location after said predetermined temperature has been reached.

2. The device of claim 1 wherein said device is a sterile containment welding device for plastic tubes having a pair of alignable tube holders, each of said tube holders having a base with a tube receiving channel which includes an outer end whereby a plastic tube may be placed in said channel and extend outwardly of said outer end, said outer ends of said tube holders being spaced from each other to create a space between said tube holders, said space being said heating location, said heat applying tool being a wafer mounted for forward movement through said space for contacting a portion of a tube extending outwardly of said outer end of each of said channels, and said self-monitoring heater unit being upstream from said space with respect to said forward direction of movement.

3. The device of claim 1 wherein said self-monitoring heater unit comprises a ribbon having an etched trace to function as a heater and having a thermocouple junction.

4. The device of claim 3 wherein said ribbon is a Chromel-Constantan ribbon.

5. The device of claim 3 wherein said ribbon is laminated onto a tape support member.

6. The device of claim 5 wherein said unit includes a pair of said ribbons located adjacent to and parallel to each other and spaced apart a distance sufficiently close whereby each of said ribbons contacts a respective side of said tool when said tool is located between said ribbons.

7. The device of claim 6 including spring members for urging said ribbons toward each other.

8. The device of claim 7 including space adjusting members movably mounted against said springs for controlling the spacing between said traces.

9. The device of claim 8 wherein said tool is mounted on a movable carriage, and said tool having a start position in a holder at said unit.

10. The device of claim 9 wherein each of said traces includes legs having an electrical resistance of 5.68± 10% ohm resistance.

11. The device of claim 10 wherein said sequence is in an alternating millisecond sequence of longer heating period than monitoring period.

12. The device of claim 1 wherein said sequence is in an alternating millisecond sequence of longer heating period than monitoring period.

13. The device of claim 1 wherein said ribbon is mounted onto a tape support member, said ribbon being a type-E thermocouple having a thickness of about 0.002 inches.

14. The device of claim 13 wherein each of said traces includes legs having an electrical resistance of 5.68±10% ohm resistance.

15. The device of claim 1 wherein said unit includes a pair of said ribbons located adjacent to and parallel to each other and spaced apart a distance sufficiently close whereby each of said ribbons contacts a respective side of said wafer when said wafer is located between said ribbon.

16. The device of claim 15 including spring members for urging said ribbons toward each other.

17. The device of claim 16 including space adjusting members movably mounted against said springs for controlling the spacing between said traces.

18. In a device for performing a heating operation including a heat applying tool for heating an object at a heating location, and a heater for heating said heat applying tool, the improvement being in that said heater includes a self-monitoring heater unit in selective contact with said tool, said self-monitoring heater unit including structure for alternately in a rapid sequence heating said tool and then monitoring the temperature of said tool until a predetermined temperature has been reached, said self-monitoring heater unit comprising a ribbon having an etched trace to function as a heater and having a thermocouple junction, said unit including a pair of said ribbons located adjacent to and parallel to each other and spaced apart a distance sufficiently close whereby each of said ribbons contacts a respective side of said tool when said tool is located between said ribbons, and said sequence being in an alternating millisecond sequence of longer heating period than monitoring period.

19. In a method for performing a heating operation including providing a heat applying tool which heats an object at a heating location and heating the heat applying tool with a heater, the improvement being in using a self-monitoring heater unit in the heater, selectively contacting the tool with the self-monitoring heater unit, using the same self-monitoring heater unit to rapidly alternately heat the tool and monitor its temperature, performing the heating and monitoring in a millisecond sequence of longer heating period than monitoring period.

20. The method of claim 19 including moving the tool to the heating location after a predetermined temperature is reached.

* * * * *